(12) United States Patent
Kim et al.

(10) Patent No.: US 10,565,421 B2
(45) Date of Patent: Feb. 18, 2020

(54) FINGERPRINT SENSOR AND METHOD OF MANUFACTURING THE SAME

(71) Applicant: SAMSUNG DISPLAY CO., LTD., Yongin-si, Gyeonggi-do (KR)

(72) Inventors: Jae Kyoung Kim, Yongin-si (KR); Ki Seo Kim, Yongin-si (KR); Won Sang Park, Yongin-si (KR); Jong In Baek, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 39 days.

(21) Appl. No.: 15/805,593

(22) Filed: Nov. 7, 2017

(65) Prior Publication Data

US 2018/0239940 A1 Aug. 23, 2018

(30) Foreign Application Priority Data

Feb. 22, 2017 (KR) .................. 10-2017-0023692

(51) Int. Cl.
| | |
|---|---|
| *G06K 9/28* | (2006.01) |
| *G06K 9/00* | (2006.01) |
| *B32B 15/08* | (2006.01) |
| *B32B 27/20* | (2006.01) |
| *G06F 3/044* | (2006.01) |
| *G06F 3/041* | (2006.01) |

(52) U.S. Cl.
CPC ............ *G06K 9/0002* (2013.01); *B32B 15/08* (2013.01); *B32B 27/20* (2013.01); *G06F 3/044* (2013.01); *G06F 3/0412* (2013.01); *G06K 9/00053* (2013.01)

(58) Field of Classification Search
CPC ............ G06K 9/0002; G06K 9/00013–9/0012
See application file for complete search history.

(56) References Cited

U.S. PATENT DOCUMENTS

| 8,669,843 B2 | 3/2014 | Chen | |
|---|---|---|---|
| 8,766,651 B2 * | 7/2014 | Kang | ................... G06K 9/0002 |
| | | | 324/662 |

(Continued)

FOREIGN PATENT DOCUMENTS

| JP | 2006-014838 | 1/2006 |
|---|---|---|
| KR | 10-2018-0001677 | 1/2018 |
| WO | WO 2015/146816 | 10/2015 |

OTHER PUBLICATIONS

Minerals.net, "The Precious Gemstone Sapphire", downloaded from https://www.minerals.net/gemstone/sapphire_gemstone.aspx on Apr. 15, 2019, pp. 1-5. (Year: 2019).*

(Continued)

*Primary Examiner* — Brian Werner
(74) *Attorney, Agent, or Firm* — F. Chau & Associates, LLC

(57) ABSTRACT

A fingerprint sensor includes a sensor substrate. A plurality of sensor pixels is configured to sense a change in capacitance corresponding to a touch of a user. Each of the plurality of sensor pixels includes a sensor electrode. A sensor protective layer is configured to protect the sensor substrate and the plurality of sensor pixels. The sensor protective layer includes a first region disposed over the sensor electrode, and a second region. The first region has a first permittivity. The second region has a second permittivity lower than the first permittivity.

10 Claims, 9 Drawing Sheets

(56) References Cited

U.S. PATENT DOCUMENTS

| | | | |
|---|---|---|---|
| 9,640,332 B2 | | 5/2017 | Gardner et al. |
| 9,805,244 B2* | | 10/2017 | Lundahl .................. G03F 7/16 |
| 2013/0287274 A1* | | 10/2013 | Shi ........................ G06F 3/044 |
| | | | 382/124 |
| 2014/0266262 A1* | | 9/2014 | Taghibakhsh ........ G06K 9/0002 |
| | | | 324/686 |
| 2015/0254491 A1 | | 9/2015 | Mo et al. |
| 2016/0098140 A1 | | 4/2016 | Lee et al. |
| 2016/0260380 A1 | | 9/2016 | Yang |
| 2016/0354801 A1 | | 12/2016 | Lundahl |
| 2017/0371462 A1 | | 12/2017 | Kim et al. |
| 2018/0276442 A1 | | 9/2018 | Kim et al. |

OTHER PUBLICATIONS

Valley Design Corp., "Optical Transmission of Sapphire Windows and Disks", copyright 2015, 2 pages. (Year: 2015).*

Ferroceramic.com, "Ceramic Properties Tables, Silicon Nitride", copyright 2012, 2 pages. (Year: 2012).*

Epoxies, Innovative Bonding Solutions Etc., "Water Clear Optically Transparent Epoxy Potting Compound and Adhesive", Jul. 2012, 2 pages total. (Year: 2012).*

Y.E. Joon et al., "Capacitive Sensor Array for Fingerprint Recognition," 2016 10th International Confrence on Sensing Technology (ICST), Dec. 26, 2016, pp. 1-4.

Extended European Search Report dated Jun. 28, 2018 for European Patent Application No. 18158104.2.

\* cited by examiner

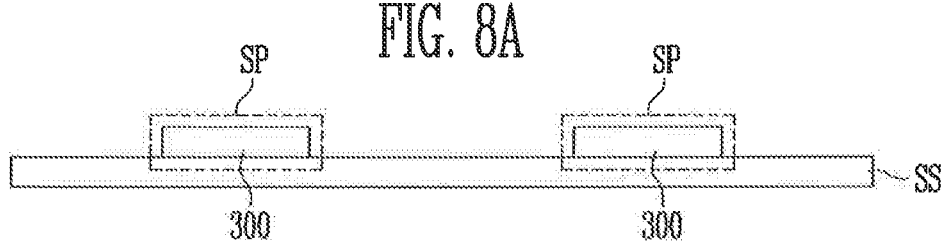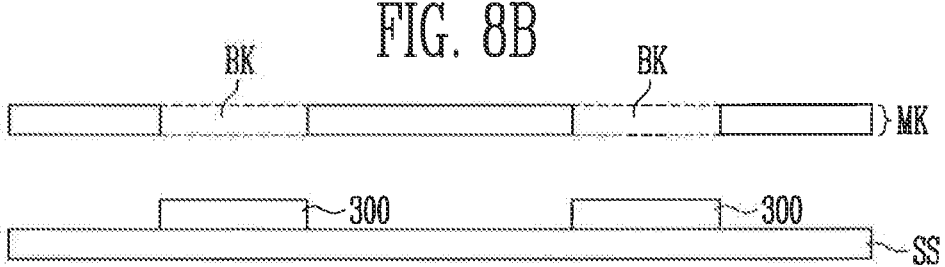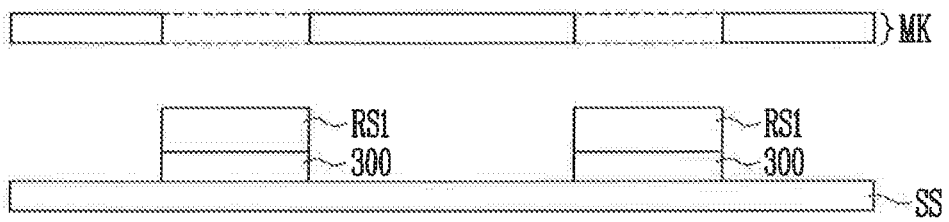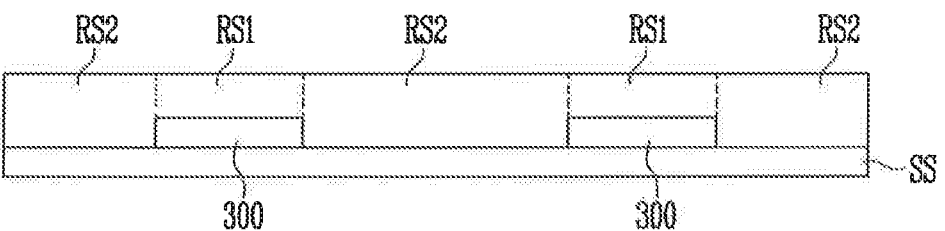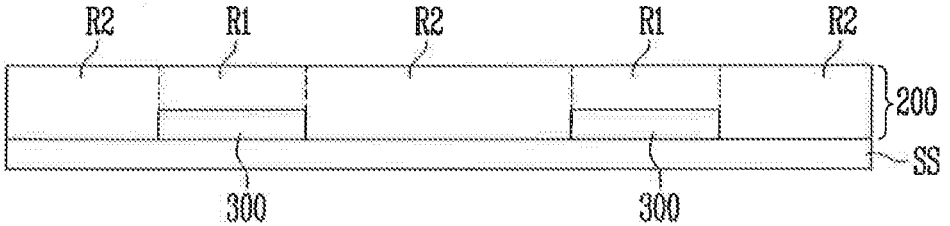

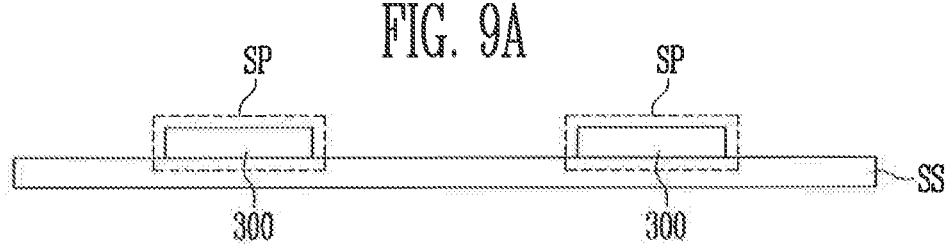
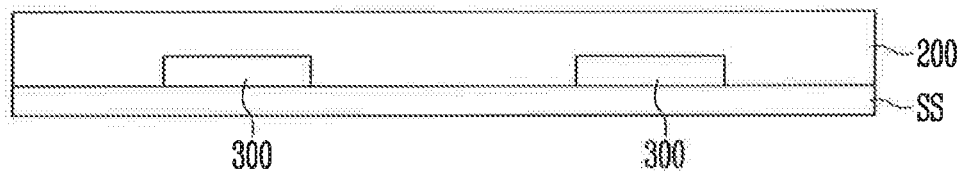
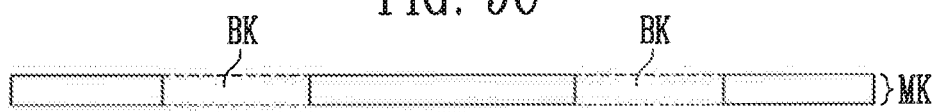
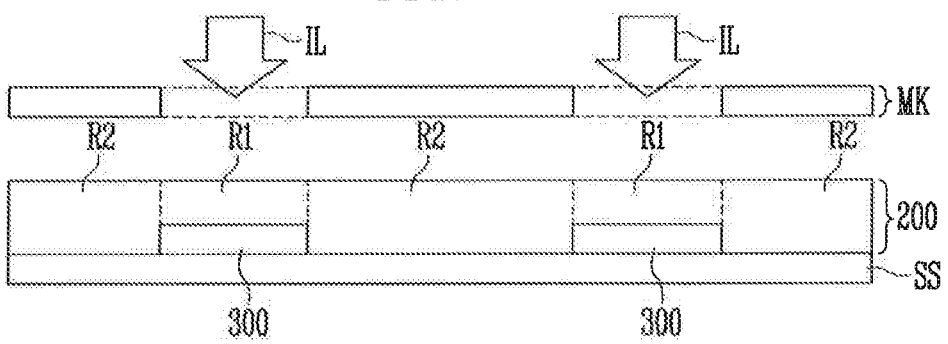
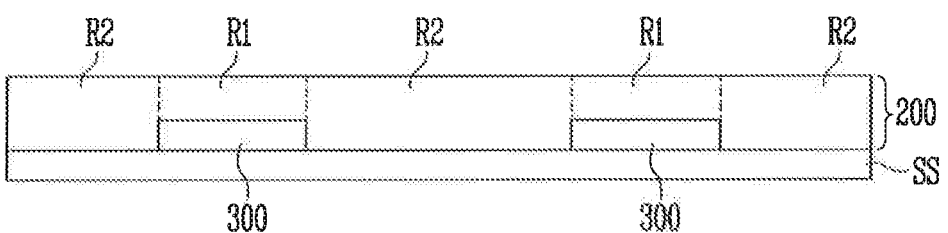

FINGERPRINT SENSOR AND METHOD OF MANUFACTURING THE SAME

CROSS-REFERENCE TO RELATED APPLICATION

The present application claims priority to Korean patent application number 10-2017-0023692 filed on Feb. 22, 2017, the entire disclosure of which is incorporated by reference herein in its entirety.

TECHNICAL FIELD

The present disclosure relates to a fingerprint sensor, and more particularly, to a fingerprint sensor and a method of manufacturing the same.

DISCUSSION OF THE RELATED ART

Fingerprint sensors have been incorporated into a surface of a display device.

One example of such an apparatus is an active self-capacitive fingerprint sensor. The active self-capacitive fingerprint sensor senses a fingerprint based on a change in capacitance of a capacitor formed between it and the hand of a user.

In the active self-capacitive fingerprint sensor, the minimum distance required between a sensor electrode of the fingerprint sensor and the hand of the user is larger than is typical for mutual-capacitive fingerprint sensors. This distance is known as the "window sensing distance."

SUMMARY

A fingerprint sensor includes a sensor substrate. A plurality of sensor pixels is configured to sense a change in capacitance corresponding to a touch of a user. Each of the plurality of sensor pixels includes a sensor electrode. A sensor protective layer is configured to protect the sensor substrate and the plurality of sensor pixels. The sensor protective layer includes a first region disposed over the sensor electrode, and a second region. The first region has a first permittivity. The second region has a second permittivity lower than the first permittivity.

A method of manufacturing a fingerprint sensor includes forming a plurality of sensor pixels on a sensor substrate. Each of the plurality of sensor pixels includes a sensor electrode. A mask is disposed over the sensor substrate and the plurality of sensor pixels. The mask includes a plurality of openings. A first resin is applied on the sensor electrodes through the plurality of openings. The sensor substrate is planarized by disposing a second resin. A sensor protective layer is formed by hardening the first resin and the second resin. The first resin has a first permittivity, and the second resin has a second permittivity lower than the first permittivity.

A method of manufacturing a fingerprint sensor includes firming a plurality of sensor pixels on a sensor substrate. Each of the plurality of sensor pixels includes a sensor electrode. A sensor protective layer is applied on the sensor substrate and the plurality of sensor pixels. A mask is disposed over the sensor protective layer. The mask includes a plurality of openings. Light is applied to the sensor protective layer through the plurality of openings. The sensor protective layer is hardened. After the hardening of the sensor protective layer, the sensor protective layer includes a first region formed over and aligned with the sensor electrode, and a second region formed over and aligned with a peripheral portion of the sensor electrode. The first region has a first permittivity, and the second region has a second permittivity lower than the first permittivity.

A fingerprint sensor integrated into a display device includes a plurality of display pixels configured to display an image. A plurality of sensor electrodes is configured to sense a change in capacitance. A sensor protective layer is disposed over the plurality of sensor electrodes. The sensor protective layer includes a plurality of first region substantially aligned with the plurality of sensor electrodes and a plurality of second regions disposed in spaces between the plurality of first regions.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 8A to 8E are diagrams illustrating a method of manufacturing the fingerprint sensor in accordance with an exemplary embodiment of the present disclosure;

FIGS. 9A to 9E are diagrams illustrating a method of manufacturing the fingerprint sensor in accordance with an exemplary embodiment of the present disclosure;

DETAILED DESCRIPTION

Figure 1:
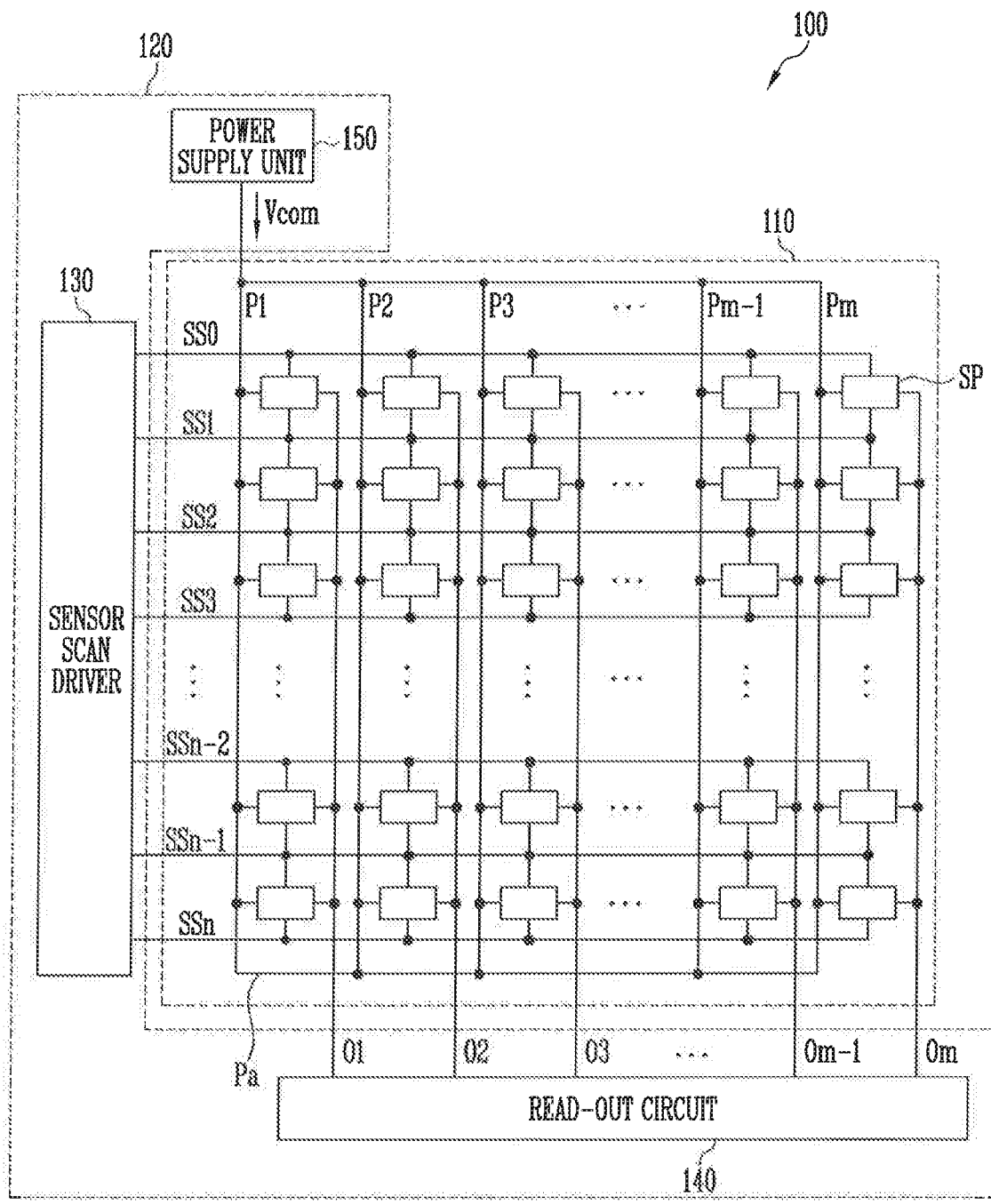
FIG. 1 is a diagram illustrating a fingerprint sensor in accordance with an exemplary embodiment of the present disclosure.

Reference will now be made in detail to various exemplary embodiments of the present disclosure, specific examples of which are illustrated in the accompanying drawings and described below, since the embodiments of the present disclosure can be variously modified in many different forms. However, it is to be appreciated that all changes, equivalents, and substitutes do not depart from the spirit and technical scope of the present disclosure and are encompassed in the present disclosure.

It will be understood that, although the terms "first", "second", etc. may be used herein to describe various components, these components should not be limited by these terms. These terms are only used to distinguish one component from other components.

The drawings are not necessarily drawn to scale and in some instances, proportions may be exaggerated in order to clearly illustrate features of the embodiments. Like reference numerals may refer to like elements throughout the specification and figures. For example, when a first layer is referred to as being "on" a second layer or "on" a substrate, it not only refers to a case where the first layer is formed directly on the second layer or the substrate but also a case where a third layer exists between the first layer and the second layer or the substrate. Hereinafter, exemplary embodiments of the present disclosure will be described in detail with reference to the attached drawings.

Figure 2:
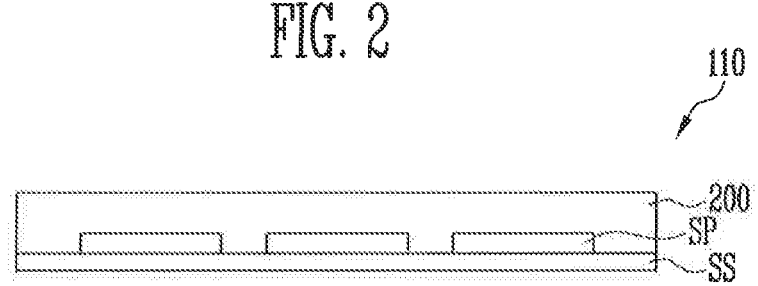
FIG. 2 is a partial sectional diagram illustrating the fingerprint sensor in accordance with an exemplary embodiment of the present disclosure.

FIG. 1 is a diagram illustrating a fingerprint sensor 100 in accordance with an exemplary embodiment of the present disclosure. FIG. 2 is a partial sectional diagram illustrating the fingerprint sensor 100 shown in FIG. 1.

The fingerprint sensor 100, in accordance with an exemplary embodiment of the present disclosure, may recognize a touch of a user.

Referring to FIGS. 1 and 2, the fingerprint sensor 100, in accordance with an exemplary embodiment of the present disclosure, may include a sensor unit 110.

The sensor unit 1110 may include a sensor substrate SS, a plurality of sensor pixels SP, and a sensor protective layer 200.

The sensor substrate SS may include an insulating material such as glass or resin. Furthermore, the sensor substrate SS may be flexible, bendable, and/or foldable, and may have a single-layer structure or multi-layer structure.

For example, the sensor substrate SS may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate.

The material constituting the sensor substrate SS may be changed in various ways, for example, the sensor substrate SS may include glass fiber reinforced plastic (FRP) or the like.

The sensor pixels SP may be disposed on the sensor substrate SS. The sensor pixels SP may be coupled with sensor scan lines SS0 to SSn and output lines O1 to Om. For example, the sensor pixels SP may be arranged in the form of a matrix at intersections of reference voltage lines P1 to Pm and the sensor scan lines SS0 to SSn.

The sensor pixels SP may each receive sensor scan signals through the sensor scan lines SS0 to SSn. The sensor pixels SP may output predetermined current corresponding to a touch state to the associated output lines O1 to Om during a supply period of the sensor scan signal.

The sensor scan lines SS0 to SSn may be disposed on the sensor substrate SS, may extend predetermined lengths in a first direction (e.g., an X-axis direction), and may be coupled to the sensor pixels SP on a line basis.

The output lines O1 to Om may be disposed on the sensor substrate SS, may extend predetermined lengths in a second direction (e.g., a Y-axis direction), and may be coupled to the sensor pixels SP on a line basis.

The sensor pixels SP may be coupled to the reference voltage lines P1 to Pm, and may be supplied with a reference voltage Vcom through the reference voltage lines P1 to Pm.

The reference voltage lines P1 to Pm may extend predetermined lengths in the second direction (e.g., the Y-axis direction), and may be coupled to the sensor pixels SP on a line basis.

For example, the reference voltage lines P1 to Pm may be arranged in parallel to the output lines O1 to Om.

The arrangement direction of the reference voltage lines P1 to Pm may be changed in various forms, and the reference voltage lines P1 to Pm may be arranged in parallel to, for example, the sensor scan lines SS0 to SSn.

The reference voltage lines P1 to Pm may be electrically coupled to each other to maintain the same electrical potential at each voltage line. For example, the reference voltage lines P1 to Pm may be electrically coupled to each other in the perimeter of the sensor substrate SS via a line Pa.

The sensor protective layer 200 may protect the sensor substrate SS and the sensor pixels SF and may be formed on both the sensor substrate SS and the sensor pixels SP.

The sensor protective layer 200 may form a surface to receive the touch of the user, and may have a single-layer structure or multi-layer structure.

For example, the sensor protective layer 200 may be made of insulating material such as glass or resin. The sensor protective layer 200 may be flexible, bendable, and/or foldable. For example, the sensor protective layer 200 may include one or more materials capable of constituting the sensor substrate SS.

Details related to the sensor protective layer 200 will be described with reference to FIG. 4.

The fingerprint sensor 100, in accordance with an exemplary embodiment of the present disclosure, may further include a sensor driving unit 120.

The sensor driving unit 120 may include a sensor scan driver 130 for driving the fingerprint sensor 100, a read-out circuit 140, and a power supply unit 150.

The sensor scan driver 130 may supply sensor scan signals to the sensor pixels SP through the sensor scan lines SS0 to SSn. For example, the sensor scan driver 130 may sequentially output the sensor scan signals to the sensor scan lines SS0 to SSn.

The sensor scan signals may have voltage levels sufficient to turn on transistors associated therewith.

For connection with the sensor scan lines SSo to SSn, the sensor scan driver 130 may be directly mounted on the sensor substrate SS or may be coupled to the sensor substrate SS through a separate component such as a flexible printed circuit board (FPCB).

The read-out circuit 140 may receive signals (e.g., currents), output from the sensor pixels SP, through the output lines O1 to Om.

For example, when the sensor scan driver 130 sequentially supplies the sensor scan signals, the sensor pixels SP may be selected on a line basis, and the read-out circuit 140 may sequentially receive, through the output lines O1 to Om, current output from the sensor pixels SP selected on a line basis.

Here, the read-out circuit 140 may recognize a touch by sensing a change in current.

For example, the touch information may include the location of a touch detected by the fingerprint sensor 100, and valleys and ridges of a fingerprint or palm print.

For connection with the output lines O1 to Om, the read-out circuit 140 may be directly mounted on the sensor substrate SS, or may be coupled with the sensor substrate SS by a separate component such as a flexible printed circuit board.

The power supply unit 150 may supply a reference voltage Vcom to the sensor pixels SP through the reference voltage lines P1 to Pm.

For connection with the reference voltage lines P1 to Pm, the power supply unit 150 may be directly mounted on the sensor substrate SS, or may be coupled with the sensor substrate SS by a separate component such as a flexible printed circuit board.

In FIG. 1, an example in which the sensor scan driver 130, the read-out circuit 140, and the power supply unit 150 are separately provided is illustrated, however, at least some of the foregoing components may be integrated with each other where desired.

The sensor scan driver 130, the read-out circuit 140, and the power supply unit 150 may each be installed using any one of various methods, such as chip on glass, chip on plastic, tape carrier package, and chip on film methods.

Figure 3:
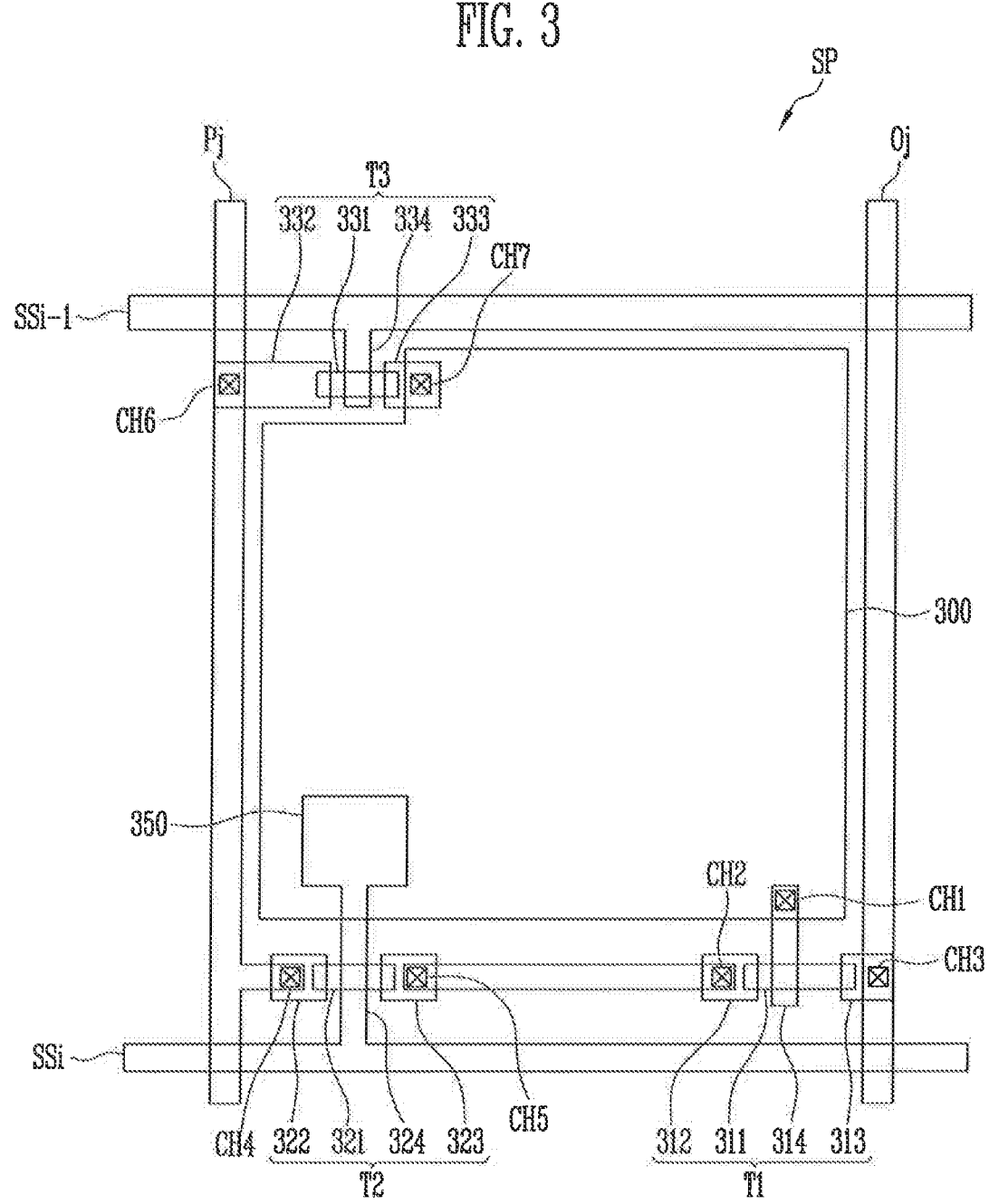
FIG. 3 is a plan diagram illustrating a sensor pixel in accordance with an exemplary embodiment of the present disclosure.

FIG. 3 is a plan view illustrating a sensor pixel SP in accordance with an exemplary embodiment of the present disclosure. In FIG. 3 a pixel is shown as being coupled to an i-th sensor scan line SSi and a j-th output line Oj (where i is an integer of 2 or more and j is a positive integer).

Referring to FIG. 3, the sensor pixel SP, in accordance with an exemplary embodiment of the present disclosure, may include a sensor electrode 300, a first transistor T1, a second transistor T2, a third transistor T3, and a capacitor electrode 350.

The first transistor T1 may control a current flowing to the j-th output line Oj. For this operation, the first transistor T1 may be coupled between the j-th output line Oj and the second transistor T2.

For example, the first transistor T1 may include a first electrode 312 coupled to a second electrode 323 of the second transistor T2, a second electrode 313 coupled to the j-th output line Oj, a gate electrode 314 coupled to the sensor electrode 300, and a semiconductor layer 311 coupled between the first electrode 312 and the second electrode 313.

The gate electrode 314, the first electrode 312, and the second electrode 313 of the first transistor T1 may be coupled to other components through respective contact holes CH1, CH2, and CH3.

Therefore, the first transistor T1 may control a current "Io" which is output to the j-th output line Oj in response to the potential of the sensor electrode 300.

The second transistor T2 may be coupled between a j-th reference voltage line Pj and the first transistor T1.

For example, the second transistor T2 may include a first electrode 322 coupled to the j-th reference voltage line Pj, a second electrode 323 coupled to the first electrode 312 of the first transistor T1, a gate electrode 324 coupled to the i-th sensor scan line SSi, and a semiconductor layer 321 coupled between the first electrode 322 and the second electrode 323.

The first electrode 322 and the second electrode 323 of the second transistor T2 may be coupled to other components through respective contact holes CH4 and CH5.

The second transistor T2 may be turned on when a sensor scan signal is supplied to the i-th sensor scan line SSi. When the second transistor T2 is turned on, a reference voltage Vcom may be applied to the first electrode 312 of the first transistor T1.

The third transistor T3 may be coupled between the j-th reference voltage line Pj and the sensor electrode 300.

For example, the third transistor T3 may include a first electrode 332 coupled to the j-th reference voltage line Pj, a second electrode 333 coupled to the sensor electrode 300, a gate electrode 334 coupled to the i-1-th sensor scan line SSi-1, and a semiconductor layer 331 coupled between the first electrode 332 and the second electrode 333.

The first electrode 332 and the second electrode 333 of the third transistor T3 may be coupled to other components through respective contact holes CH6 and CH7.

The third transistor T3 may be turned on when a sensor scan signal is supplied to the i-1-th sensor scan line SSi-1. When the third transistor T3 is turned on, the voltage of the sensor electrode 300 may be initialized to the reference voltage Vcom.

The capacitor electrode 350 may be disposed to overlap the sensor electrode 300, and may thus form a capacitor with the sensor electrode 300.

The capacitor electrode 350 may be coupled to the i-th sensor scan line SSi. For example, the capacitor electrode 350 may be coupled to the i-th sensor scan lime SSi through the gate electrode 324 of the second transistor 12.

Here, the capacitor electrode 350 and the gate electrode 324 of the second transistor T2 may be made of the same material as that of the i-th sensor scan line SSi.

The sensor electrode 300 may form a capacitor with the capacitor electrode 350 and a finger, stylus, or the like, of the user.

The sensor electrode 300 may include conductive material. For example, the conductive material may include a metal material, a metal alloy, a conductive polymer, or a transparent conductive material.

Examples of the metal material may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead.

Furthermore, examples of the conductive polymer may include polythiophene, polypyrrole, polyaniline, polyacetylene and polyphenylene compounds, and mixtures thereof. In particular, a poly-3,4-ethylenedioxythiophene/polystyrenesulfonate (PEDOT/PSS) compound of the polythiophene conductive polymer may be used.

Examples of the transparent conductive material may include silver nanowires (AgNW), indium tin oxide (ITO), indium zinc oxide (IZO), antimony zinc oxide (AZO), indium tin zinc oxide (ITZO), zinc oxide (ZnO) tin oxide ($SnO_2$), a carbon nanotube, and grapheme.

Figure 4:
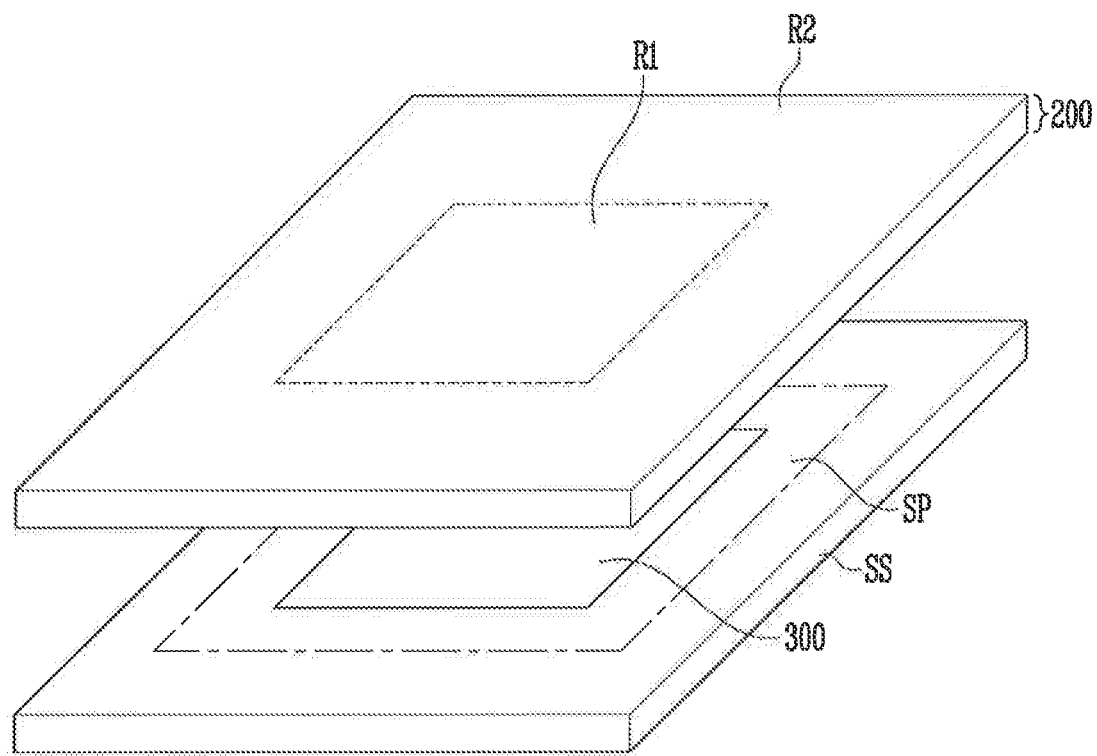
FIG. 4 is a diagram illustrating a sensor protective layer in accordance with an exemplary embodiment of the present disclosure.

FIG. 4 is a diagram illustrating in detail a sensor protective layer 200 in accordance with an exemplary embodiment of the present disclosure. FIG. 4 illustrates the sensor protective layer 200 which is formed on the sensor pixel SP and the sensor substrate SS. In FIG. 4, for the sake of description, the sensor substrate SS and the sensor protective layer 200 are illustrated as being spaced apart from each other as an exploded view. However, the sensor substrate ss and the sensor protective layer 200 may actually be joined together. Furthermore, in FIG. 4, for the sake of description, only the sensor electrode 300 of the components of the sensor pixel SP shown in FIG. 3 is illustrated, but the present disclosure is not limited thereto.

Referring to FIGS. 2 to 4, the sensor protective layer 200 may include a first region R1, and a second region R2 which extends outwardly from the periphery of the first region R1.

The first region R1 may be a region disposed over the sensor electrode 300. The second region R2 may be a region disposed above a peripheral portion of the sensor electrode 300.

The sensor protective layer 200 may be relatively hard. For example, the sensor protective layer 200 may have a hardness ranging from 8 H to 10 H according to the Mohs hardness system.

The sensor protective layer 200 may have a relatively high light transmissivity. For example, the sensor protective layer 200 may have light transmittance ranging from about 90% to about 100%.

Hereinbelow, permittivity of the sensor protective layer 200 will be described.

$$C = E * A/d, \quad \text{[Equation 1]}$$

Here, C refers to capacitance, E refers to permittivity, A refers to an area of an electrode plate, and d refers to a distance between electrode plates.

$$Er = E/E0, \quad \text{[Equation 2]}$$

Here, Er refers to a dielectric constant, E refers to permittivity, and E0 refers to permittivity in vacuum and has $8.854185 \times 10^{\wedge}(-12)$F/m (under conditions of room temperature and frequency of 1 kHz).

In detail, the permittivity changes depending on the temperature or frequency.

For example, polycrystalline silicon nitride may have a dielectric constant ranging from 7 to 8 under conditions of room temperature and frequency of 1 MHz.

For example, barium titanate ($BaTiO_3$) may have a dielectric constant of 1200 or more under conditions of room temperature and frequency of about 1 kHz.

The first region R1 may have a first permittivity. The first permittivity may be a permittivity higher than a second permittivity. For example, the first permittivity may be a dielectric constant of 7 or more under conditions of room temperature and frequency of 1 MHz.

The second region R2 may have the second permittivity different from the first permittivity. The second permittivity may be a permittivity lower than the first permittivity. For example, the second permittivity may be a dielectric constant which is 1 or more and less than 7 under conditions of room temperature and frequency of 1 MHz.

The first region R1 may include an inorganic filler at a first ratio. The first ratio may be a volume or weight ratio of the inorganic filler to resin that forms the first region R1 of the sensor protective layer 200. The first ratio may be set to an appropriate value to give the first region R1 the first permittivity.

The second region R2 may include an inorganic filler at a second ratio that is lower than the first ratio. The second ratio may be a volume or weight ratio of the inorganic filler to resin that forms the second region R2 of the sensor protective layer 200. The second ratio may be set to an appropriate value to give the second region R2 the second permittivity.

For example, the inorganic filler may include at least one of barium titanate ($BaTiO_3$), alumina ($Al_2O_3$) and titanium dioxide ($TiO_2$).

Figure 5A:
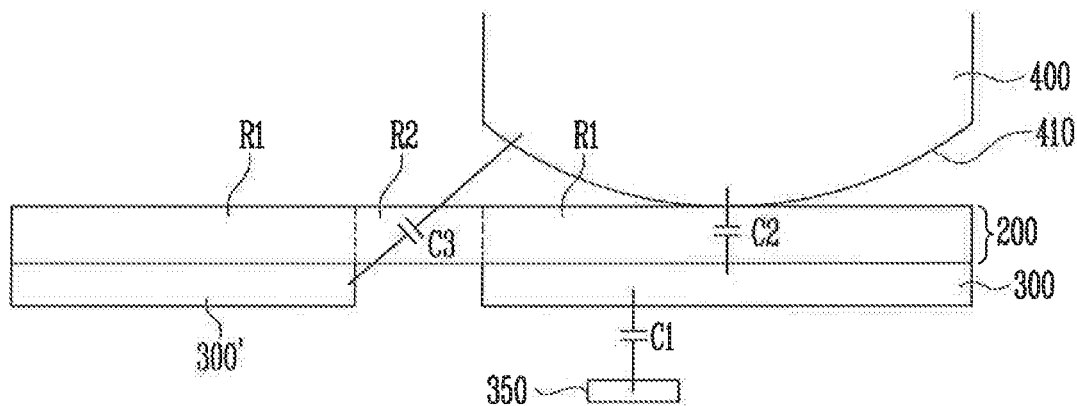
FIGS. 5A and 5B are diagrams illustrating a change in capacitance of a second capacitor related to a sensor electrode depending on a ridge and a valley of a fingerprint in accordance with exemplary embodiments of the present disclosure.
Figure 5B:
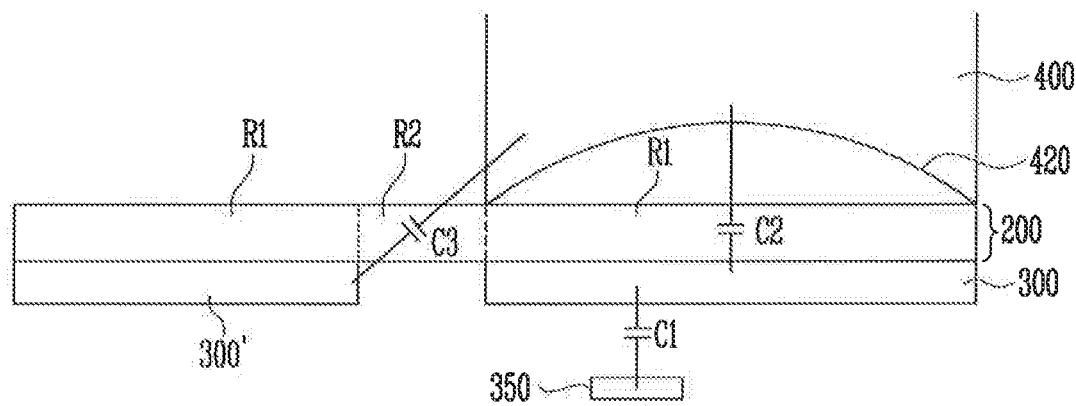

FIGS. 5A and 5B are sectional diagrams of the sensor pixel SP in accordance with an exemplary embodiment of the present disclosure, FIGS. 5A and 5B are diagrams illustrating a change in capacitance of a second capacitor C2 related to the sensor electrode 300 depending on a ridge and a valley of a fingerprint.

For example, FIG. 5A illustrates the case where a ridge 410 of a finger 400 is disposed over the sensor pixel SP, and FIG. 5B illustrates the case where a valley 420 of the finger 400 is located disposed over the sensor pixel SP.

Referring to FIGS. 4 to 5A and 5B, the first region R1 of the sensor protective layer 200 may be disposed on the sensor electrode 300. The sensor protective layer 200 may be used as a surface to receive a touch of the user.

For the sake of description, an adjacent sensor electrode 300 is also illustrated along with the sensor electrode 300 in FIGS. 5A and 5B.

The sensor electrode 300 and the capacitor electrode 350 may form a first capacitor C1. The sensor electrode 300 and the capacitor electrode 350 may be spaced apart from each other, and at least one insulating layer may be interposed therebetween.

When the finger 400 of the user is placed on the sensor pixel SP to recognize a fingerprint, the sensor electrode 300 and the finger 400 may form a second capacitor C2.

Here, the second capacitor C2 is a variable capacitor, the capacitance of which may vary depending on whether the ridge 410 or valley 420 of the fingerprint is placed on the sensor electrode 300.

Since the distance between the ridge 410 and the sensor electrode 300 is shorter than the distance between the valley 420 and the sensor electrode 300, the capacitance of the second capacitor C2 in the case where the ridge 410 is placed on the sensor electrode 300, as shown in FIG. 5A, and the capacitance of the second capacitor C2 in the case where the valley 420 is placed on the sensor electrode 300, as illustrated in FIG. 5B, may differ from each other.

Referring to FIGS. 1 to 5A and 5B, since a change in the capacitance of the second capacitor C2 influences the output current "Io" of the sensor pixel SP, the read-out circuit 140 may recognize the fingerprint or the palm print of the user by sensing a change in the output current "Io."

The sensor electrode 300' and the finger 400 may form a third capacitor C3. The third capacitor C3 may be a variable capacitor, and the capacitance of the third capacitor may be undesirable.

As shown in FIGS. 5A and 5B, the adjacent sensor electrode 300' might not recognize the ridge 410 or the valley 420 of the finger 400 because of the third capacitor C3. This may cause a defective sensing operation of the fingerprint sensor 100.

To avoid the above-mentioned problem, in the fingerprint sensor 100, in accordance with an exemplary embodiment of the present disclosure, the first region R1, having a relatively high permittivity, may be disposed over the sensor electrode 300, and the second region R2, having a relatively low permittivity, may be disposed over a region defined between the sensor electrode 300 and the adjacent sensor electrode 300'.

As shown in FIGS. 5A and 5B, when the first region R1 having a high permittivity is disposed between the sensor electrode 300 and the ridge 410 or the valley 420, the capacitance of the second capacitor C2, which may be calculated by Equation 1, may be increased.

Likewise, when the second region. R2 having a low permittivity is disposed between the adjacent sensor electrode 300' and the ridge 410 or the valley 420, the capacitance of the third capacitor C3, which may be calculated by Equation 1, may be reduced.

Therefore, a ratio of the capacitance of the second capacitor C2 to the capacitance of the third capacitor C3 may be comparatively increased.

Consequently, the fingerprint sensor 100, in accordance with an exemplary embodiment of the present disclosure, may have enhanced sensing sensitivity.

Figure 6:
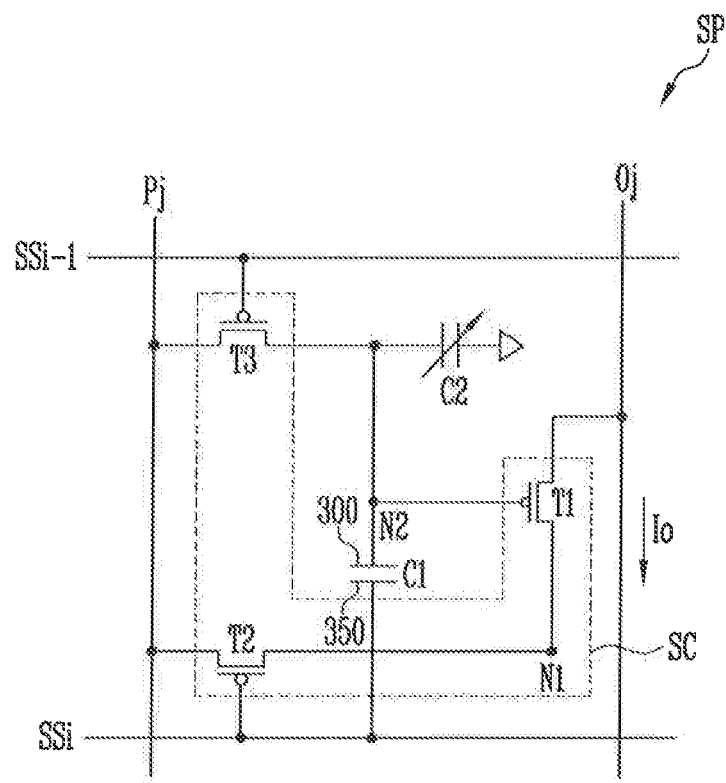
FIG. 6 is a diagram illustrating an equivalent circuit of the sensor pixel shown in FIG. 3, according to an exemplary embodiment of the present invention.
Figure 7:
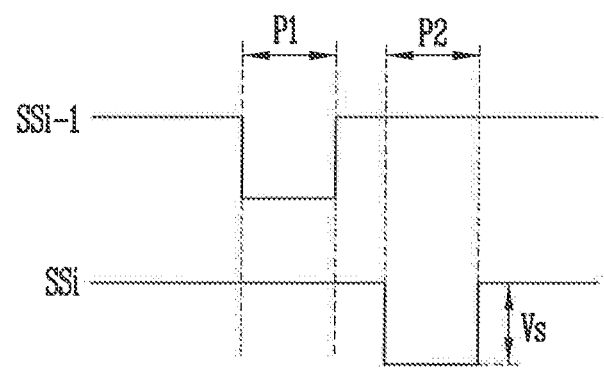
FIG. 7 is a waveform diagram illustrating the operation of the sensor pixel shown in FIG. 6.

FIG. 6 is a diagram illustrating an equivalent circuit diagram of the sensor pixel SP shown in FIG. 3, according to an exemplary embodiment of the present disclosure. FIG. 7 is a waveform diagram illustrating the operation of the sensor pixel SP shown in FIG. 6.

In particular, for the sake of the description, a sensor pixel SP coupled to an i-th sensor scan line SSi, an i−1-th sensor scan line SSi−1, and a j-th output line Oj is illustrated in FIG. 6. In FIG. 7, a sensor scan signal that is supplied to the i−1-th sensor scan line SSi−1 and a sensor scan signal that is supplied to the i-th sensor scan line SSi are illustrated.

Referring to FIG. 6, the sensor pixel SP may include a sensor electrode 300, a capacitor electrode 350, a first transistor T1, a second transistor T2, and a third transistor T3.

As described above, the sensor electrode 300 and the capacitor electrode 350 may constitute the first capacitor C1. The first transistor T1, the second transistor T2, and the third transistor T3 may form a sensor circuit SC.

The second capacitor C2, which is a variable capacitor, may be formed by the sensor electrode 300 and the finger 400, as described above. Here, the capacitance of the second capacitor C2 may change depending on the distance between the sensor electrode 300 and the finger 400, whether the valley or ridge of a fingerprint is placed on the sensor electrode 300, the magnitude of pressure applied by a touch, or the like.

The first transistor T1 may control a current flowing to the j-th output line Oj. For this operation, the first transistor T1 may be coupled between the j-th output line Oj and the second transistor T2.

For example, the first transistor T1 may be coupled between the j-th output line Oj and a first node N1, and the gate electrode thereof may be coupled to a second node N2.

For example, the first transistor T1 may include a first electrode coupled to a second electrode of the second transistor 12, a second electrode coupled to the j-th output line Oj, and a gate electrode coupled to the sensor electrode 300.

The second transistor 12 may be coupled between a j-th reference voltage line Pj and the first transistor T1.

For example, the second transistor T2 may be coupled between the j-th reference voltage line Pj and the first node N1, and the gate electrode thereof may be coupled to the i-th sensor scan line SSi.

For example, the second transistor T2 may include a first electrode coupled to the j-th reference voltage line P1, a second electrode coupled to the first electrode of the first transistor T1, and a gate electrode coupled to the i-th sensor scan line SSi.

Therefore, the second transistor 12 may be turned on when a sensor scan signal is supplied to the i-th sensor scan line SSi. When the second transistor 12 is turned on, a reference voltage Vcom may be applied to the first electrode of the first transistor T1.

The third transistor T3 may be coupled between the j-th reference voltage live Pj and the sensor electrode 300.

For example, the third transistor T3 may be coupled between the second node N2 and the j-th reference voltage line Pj, and the gate electrode thereof may be coupled to the i−1-th sensor scan line SSi−1.

For example, the third transistor T3 may include a first electrode coupled to the j-th reference voltage line Pj, a second electrode coupled to the sensor electrode 300, and a gate electrode coupled to the i−1-th sensor scan line SSi−1.

Therefore, the third transistor T3 may be turned on when a sensor scan signal is supplied to the i−1-th sensor scan line SSi−1. When the third transistor T3 is turned on, the voltage of the sensor electrode 300 may be initialized to the reference voltage Vcom.

The capacitor electrode 350 may be disposed to overlap the sensor electrode 300, and may thus form the first capacitor C1 with the sensor electrode 300.

The capacitor electrode 350 may be coupled to the i-th sensor scan line SSi.

The first capacitor C1 may be coupled between the second node N1 and the i-th sensor scan line SSi.

The second capacitor C2 may be coupled to the second node N2.

The first node N1 is a node to which the first electrode of the first transistor T1 and the second electrode of the second transistor T2 are coupled in common, and the second node N2 is a node to which the sensor electrode 300, the gate electrode of the first transistor T1, and the second electrode of the third transistor T3 are coupled in common.

Here, the first electrode of each of the transistors T1, T2, and T3 may be set to any one of a source electrode and a drain electrode, and the second electrode of each of the transistors T1, T2, and T3 may be set to an electrode different from the first electrode. For example, if the first electrode is set to a source electrode, the second electrode may be set to a drain electrode.

FIG. 6 illustrates an example in which the transistors T1, T2, and T3 are PMOS transistors, but in various embodiments, the transistors T1, T2, and T3 may be embodied by NMOS transistors.

FIG. 7 is a waveform diagram illustrating the operation of the sensor pixel SP shown in FIG. 6. Referring to FIG. 7, during a first period P1, a sensor scan signal may be supplied to the i−1-th sensor scan line SSi−1.

Therefore, during the first period P1, the third transistor T3 may remain turned on, and the second node N2 may be initialized to the reference voltage Vcom which is applied from the j-th reference voltage line Pj.

Thereafter, during a second period P2, the sensor scan signal may be supplied to the i-th sensor scan line SSi.

Therefore, during the second period P2, the second transistor T2 may remain turned on, and the current "Io" may flow from the j-th reference voltage line Pj to the j-th output line Oj through the second transistor T2 and the first transistor T1.

Here, the first transistor T1 may control the amount of output current "Io" in response to a gate voltage (e.g., voltage applied to the second node N2).

For example, the output current "Io" may change depending on the gate voltage Vg of the first transistor T1, and the gate voltage Vg of the first transistor T1 may be determined by the following equation:

$$Vg = Vcom + \{Vc1/(Vc1+Vc2)\}*Vs$$

Here, Vcom denotes the reference voltage, Vc1 denotes the capacitance of the first capacitor C1, Vc2 denotes the capacitance of the second capacitor C2, and Vs denotes a change in the voltage of the sensor scan signal that is supplied to the i-th sensor scan line SSi.

FIGS. 8A to 8E are diagrams illustrating a method of manufacturing the fingerprint sensor in accordance with an exemplary embodiment of the present disclosure.

In FIGS. 8A to 8E, for the sake of description, only the sensor electrode 300 of the components of the sensor pixel SP shown in FIG. 3 is illustrated, but the present disclosure is not limited thereto.

Referring to FIG. 8A, a plurality of sensor pixels SP may be formed on the sensor substrate SS. Each of the sensor pixels SP may include the sensor electrode 300.

Referring to FIG. 8B, a mask MK including openings BK may be disposed over the plurality of sensor pixels SP. The openings BK are holes in the mask MK.

For example, the mask MK may be aligned over the plurality of sensor pixels SP such that the openings BK are disposed over the respective sensor electrodes included in the sensor pixels SP.

Referring to FIG. 8C, first resin RS1 may be applied on the sensor electrodes 300 through the openings BK of the mask MK.

The first resin RS1 may have a first permittivity. The first permittivity may be a permittivity higher than a second permittivity. For example, the first permittivity may be a dielectric constant of 7 or more under conditions of room temperature and frequency of 1 MHz.

Referring to FIG. 8D, the mask MK may be removed, and an upper surface of the sensor substrate SS may be planarized using second resin RS2. For example, the second resin RS2 may be formed on a portion of the sensor substrate SS on which the first resin RS1 has not been formed. After the planarization, the upper surface of the first resin RS1 may be level with that of the second resin RS2.

The second resin RS2 may have a second permittivity different from the first permittivity. The second permittivity may be a permittivity lower than the first permittivity. For example, the second permittivity may be a dielectric constant. Which is 1 or more and less than 7 under conditions of room temperature and frequency of 1 MHz.

Referring to FIG. 8E, the first resin RS1 and the second resin RS2 may be hardened, for example, within a single hardening step. For example, the first resin RS1 and the second resin RS2 may be hardened by an optical (using light) or thermal (using heat) hardening method.

As the first resin RS1 and the second resin RS2 are hardened, a sensor protective layer 200 may be formed on the plurality of sensor pixels SP and the sensor substrate SS.

After the hardening, the sensor protective layer 200 may include a first region R1 in which the first resin RS1 has been hardened, and a second region R2 in which the second resin RS2 has been hardened.

The sensor protective layer 200 may be relatively hard. For example, the sensor protective layer 20 may have a hardness ranging from 8 H to 10 H.

The sensor protective layer 200 may be transmissive of light. For example, the sensor protective layer 200 may have light transmittance ranging from 90% to 100%.

The first region R1 may have a first permittivity. The first permittivity may be a permittivity higher than a second permittivity. For example, the first permittivity may be a dielectric constant of 7 or more under conditions of room temperature and frequency of 1 MHz.

The second region R2 may have the second permittivity different from the first permittivity. The second permittivity may be a permittivity lower than the first permittivity. For example, the second permittivity may be a dielectric constant which is 1 or more and less than 7 under conditions of room temperature and frequency of 1 MHz.

The first region R1 may include an inorganic filler at a first ratio. The first ratio may be a volume or weight ratio of the inorganic filler to resin that forms the first region R1 of the sensor protective layer 200. The first ratio may be set to an appropriate value to give the first region R1 the first permittivity.

The second region. R2 may include an inorganic filler at a second ratio that is lower than the first ratio. The second ratio may be a volume or weight ratio of the inorganic filler to resin that forms the second region R2 of the sensor protective layer 200. The second ratio may be set to an appropriate value to give the second region R2 the second permittivity.

For example, the inorganic filler may include at least one of barium titanate ($BaTiO_3$), alumina ($Al_2O_3$), and titanium dioxide ($TiO_2$).

FIGS. 9A to 9E are diagrams illustrating a method of manufacturing the fingerprint sensor in accordance with an exemplary embodiment of the present disclosure.

In FIGS. 9A to 9E, for the sake of description, only the sensor electrode 300 of the components of the sensor pixel SP shown in FIG. 3 is illustrated, but the present disclosure is not limited thereto.

Referring to FIG. 9A, a plurality of sensor pixels SP may be formed on the sensor substrate 55. Each of the sensor pixels SP may include the sensor electrode 300.

Referring to FIG. 9B, a sensor protective layer 200 may be applied on the sensor substrate SS and the sensor pixels SP.

For the sake of description, the same reference numeral is used to designate the sensor protective layer 200 shown in FIGS. 9B to 9E. However, the sensor protective layer 200 shown in FIGS. 9B and 9C may differ from the sensor protective layer 200 shown in FIGS. 9D and 9E in terms of permittivity or a distribution ratio of inorganic filler. Details pertaining to this will be described below.

The sensor protective layer 200 shown in FIG. 9B may have a reference permittivity. The reference permittivity may be a median permittivity which is lower than a first permittivity and higher than a second permittivity.

The sensor protective layer 200 may include an inorganic filler at a reference ratio. The reference ratio may be a volume or weight ratio of the inorganic filler to resin that forms the sensor protective layer 200. The reference ratio may be set to an appropriate value to give the sensor protective layer 200 the reference permittivity.

Referring to FIG. 9C, a mask. MK including openings BK may be disposed over the sensor protective layer 200.

For example, the mask MK may be aligned over the plurality of sensor pixels SP such that the openings BK are disposed over the respective sensor electrodes included in the sensor pixels SP.

Referring, to FIG. 9D, light IL may be incident through the openings. The light IL may be incident on only the sensor electrodes 300 included in the sensor pixels SP by the mask MK.

For example, the light IL may be applied to the sensor protective layer 200 through the openings BK. For example, the light IL may be ultraviolet light.

In this case, the inorganic filler included in the sensor protective layer 200 may be concentrated into the first regions R1 to which the light IL is applied. Photoreaction material contained in the inorganic filler may react to the light IL, thus making the inorganic filler concentrated into the first regions R1.

The inorganic filler may be a component having a permittivity higher than the reference permittivity.

As the light IL is applied to the sensor protective layer 200, the first region R1 disposed on each sensor electrode 300 may have the first permittivity, and the second region R2 disposed on the peripheral portion of the sensor electrode 300 may have the second permittivity.

The first region R1 may have the first permittivity. The first permittivity may be a permittivity higher than the second permittivity. For example, the first permittivity may be a dielectric constant of 7 or more under conditions of room temperature and frequency of 1 MHz.

The second region R2 may have the second permittivity different from the first permittivity. The second permittivity may be a permittivity lower than the first permittivity. For example, the second permittivity may be a dielectric constant which is 1 or more and less than 7 under conditions of room temperature and frequency of 1 MHz.

The first region R1 may include an inorganic filler at a first ratio. The first ratio may be a volume or weight ratio of the inorganic filler to resin that forms the first region R1 of the sensor protective layer 200. The first ratio may be set to an appropriate value to give the first region R1 the first permittivity.

The second region R2 may include the inorganic filler at a second ratio that is lower than the first ratio. The second ratio may be a volume or weight ratio of the inorganic filler to resin that forms the second region R2 of the sensor protective layer 200. The second ratio may be set to an appropriate value to give the second region R2 the second permittivity.

For example, the inorganic filler may include at least one of barium titanate ($BaTiO_3$), alumina ($Al_2O_3$), and titanium dioxide ($TiO_2$).

Referring to FIG. 9E, the mask MK may be removed. The sensor protective layer 200 may be hardened. For example, the sensor protective layer 200 may be hardened by an optical (by light) or thermal (by heat) hardening method.

The sensor protective layer 200 may be relatively hard. For example, the sensor protective layer 20 may have a hardness ranging from 8 H to 10 H.

The sensor protective layer 200 may be transmissive of light. For example, the sensor protective layer 200 may have light transmittance ranging from 90% to 100%.

Figure 10:
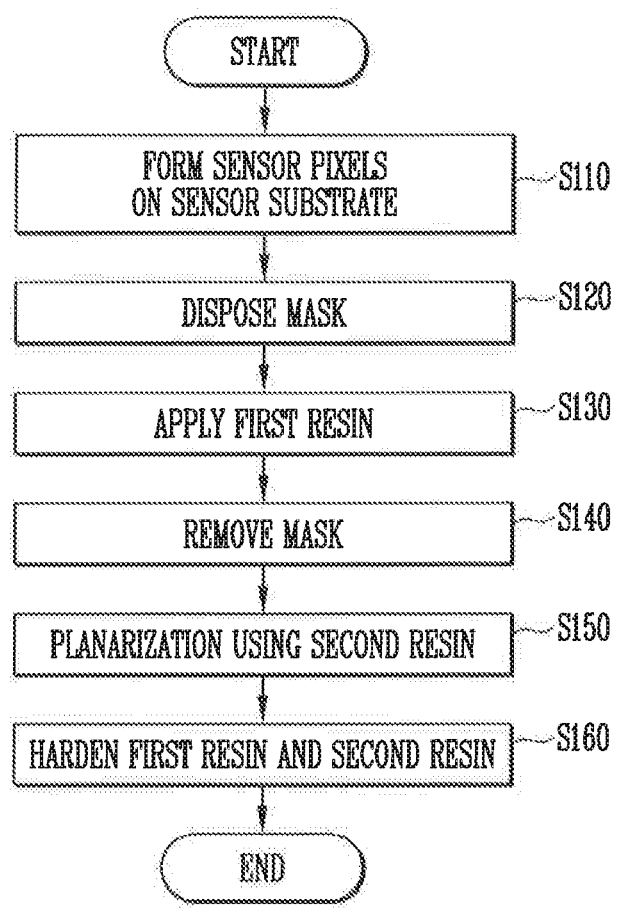
FIG. 10 is a flowchart illustrating the fingerprint sensor manufacturing method shown in FIGS. 8A to 8E.

FIG. 10 is a flowchart of the fingerprint sensor manufacturing method shown in FIGS. 8A to 8E.

Referring to FIGS. 8A to 8E and 10, the sensor pixels SP may be formed on the sensor substrate SS, at step S110. Each of the sensor pixels SP may include the sensor electrode 300.

The mask MK including the openings BK may be disposed over the sensor pixels SP, at step S120. For example, the mask MK may be aligned over the plurality of sensor pixels SP such that the openings BK are disposed over the respective sensor electrodes included in the sensor pixels SP.

The first resin RS1 may be applied on the sensor electrodes 300 through the openings BK of the mask MK, at step S130. Therefore, the first resin RS1 may be formed on only the sensor electrodes 300.

The mask MK may be removed, at step S140.

The upper surface of the sensor substrate SS may be planarized using the second resin RS2, at step S150. For example, the second resin RS2 may be formed on a portion of the sensor substrate SS on which the first resin. RS1 has not been formed. After the planarization, the upper surface of the first resin RS1 may be level with that of the second resin RS2.

The first resin RS1 and the second resin RS2 may be hardened, at step S160. The first resin RS1 and the second resin RS2 may be hardened by an optical or thermal hardening method.

As the first resin RS1 and the second resin RS2 are hardened, the sensor protective layer 200 may be formed on the sensor pixels SP and the sensor substrate SS.

The sensor protective layer 200 may include the first region R1, in which the first resin RS1 has been hardened, and the second region R2, in which the second resin RS2 has been hardened.

Figure 11:
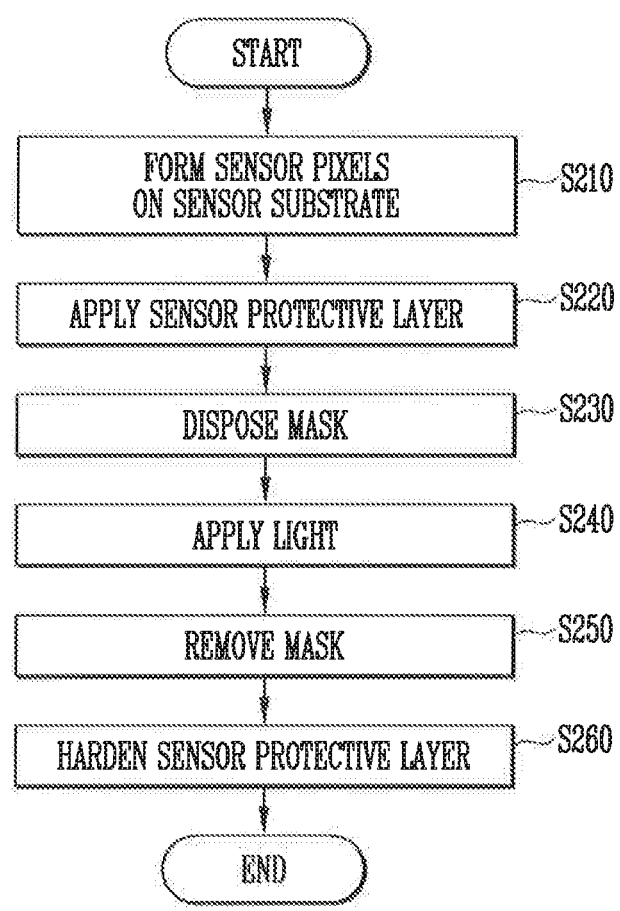
FIG. 11 is a flowchart illustrating the fingerprint sensor manufacturing method shown in FIGS. 9A to 9E.

FIG. 11 is a flowchart of the fingerprint sensor manufacturing method shown in FIGS. 9A to 9E.

Referring to FIGS. 9A to 9E and 11, the sensor pixels SP may be formed on the sensor substrate SS, at step S210. Each of the sensor pixels SP may include the sensor electrode 300.

The sensor protective layer 200 may be applied on the sensor substrate SS and the sensor pixels SP, at step S220. The sensor protective layer 200 may include an inorganic filler at a reference ratio. For instance, the sensor protective layer 200 may include at least one of barium titanate ($BaTiO_3$), alumina ($Al_2O_3$), and titanium dioxide ($TiO_2$).

The mask MK including the openings BK may be disposed over the sensor protective layer 200, at step S230. For example, the mask MK may be aligned over the plurality of sensor pixels SP such that the openings BK are disposed over the respective sensor electrodes included in the sensor pixels SP.

Light IL may be incident through the openings BK, at step S240. The light IL may be incident on only the sensor electrodes 300 included in the sensor pixels SP by the mask MK.

For example, the light IL may be applied to the sensor protective layer 200 through the openings BK. For example, the light IL may be ultraviolet light.

In this case, the inorganic filler (e.g., barium titanate) included in the sensor protective layer 200 may be concentrated into portions (e.g., first regions R1) to which the light IL is applied. For example, photoreaction material contained in the inorganic filler may react to the light II, thus making the inorganic filler concentrated into the first regions R1.

The inorganic filler may be a component having a permittivity higher than the reference permittivity.

Consequently, as the light IL is applied to the sensor protective layer 200, the first region R1 disposed on each sensor electrode 300 may have the first permittivity, and the second region R2 disposed on the peripheral portion of the sensor electrode 300 may have the second permittivity.

The mask MK may be removed, at step S250.

The sensor protective layer 200 may be hardened, at step S260. For example, the sensor protective layer 200 may be hardened by an optical (with light) or thermal (with heat) hardening method.

As described above, a fingerprint sensor, in accordance with an exemplary embodiment of the present disclosure, may satisfy a required window sensing distance condition and have increased sensing sensitivity.

The fingerprint sensor, in accordance with an exemplary embodiment of the present disclosure, may have enhanced hardness.

A method of manufacturing a fingerprint sensor in accordance with an exemplary embodiment of the present disclosure may simplify a manufacturing process.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A fingerprint sensor comprising:
   a sensor substrate having a central region and a peripheral region at least partially surrounding the central region;
   a plurality of sensor pixels disposed on the sensor substrate, each of the plurality of sensor pixels including a sensor electrode; and a sensor protective layer disposed over the sensor substrate and the plurality of sensor pixels and configured to protect the sensor substrate and the plurality of sensor pixels, wherein the sensor protective layer is a single continuous structure including a first region disposed over the central region of the sensor substrate, and a second region disposed over the peripheral region of the sensor substrate, wherein the first region of the sensor protective layer does not overlap the second region of the sensor protective layer, wherein the first region is a single layer that has a first permittivity, wherein the second region is a single layer that has a second permittivity lower than the first permittivity, and wherein both the first region and the second region include an inorganic filler and a concentration of the inorganic filler in the first region is higher than a concentration of the inorganic filler in the second region.

2. The fingerprint sensor according to claim 1, wherein the sensor protective layer has a hardness ranging from 8 H to 10 H.

3. A fingerprint sensor comprising:
a sensor substrate;
a plurality of sensor pixels, each of the plurality of sensor pixels including a sensor electrode;
a sensor protective layer configured to protect the sensor substrate and the plurality of sensor pixels;
a plurality of sensor scan lines coupled with the plurality of sensor pixels and a plurality of output lines coupled with the plurality of sensor pixels, wherein a sensor pixel, of the plurality of sensor pixels, coupled with an i-th sensor scan line, where i is an integer of 2 or more, and a j-th output line, where j is a positive integer, comprises:
a first transistor comprising a first gate electrode coupled to the sensor electrode, the first transistor being configured to control current to be outputted through the j-th output line;
a second transistor comprising a second gate electrode coupled to the i-th sensor scan line, the second transistor being coupled between a reference voltage line and the first transistor; and
a capacitor electrode configured to form a first capacitor with the sensor electrode, and coupled to the i-th sensor scan line,
wherein the sensor protective layer includes a first region disposed over the sensor electrode, and a second region, wherein the first region has a first permittivity,
wherein the second region has a second permittivity lower than the first permittivity, and
wherein the sensor protective layer has a hardness ranging from 8 H to 10 H.

4. The fingerprint sensor according to claim 3, wherein the sensor pixel further comprises a third transistor comprising a third gate electrode coupled to an (i−1)-th scan line, the third transistor being coupled between the reference voltage line and the sensor electrode.

5. The fingerprint sensor according to claim 4, wherein, when a touch is generated, the plurality of sensor electrodes form a second capacitor with a hand of a user.

6. The fingerprint sensor according to claim 5, wherein the fingerprint sensor is configured to recognize a fingerprint or a palm print of the user using a change in a capacitance of the second capacitor corresponding to the touch.

7. The fingerprint sensor according to claim 3, further comprising: a sensor scan driver configured to sequentially supply sensor scan signals to the sensor scan lines.

8. The fingerprint sensor according to claim 7, further comprising: a read-out circuit configured to detect a fingerprint or a palm print using current output from through the output lines.

9. The fingerprint sensor according to claim 2, wherein the sensor protective layer has a light transmittance ranging from 90% to 100%.

10. The fingerprint sensor according to claim 1, wherein the inorganic filler includes barium titanate; alumina, or titanium dioxide.

* * * * *